United States Patent [19]

Lock

[11] 4,439,925
[45] Apr. 3, 1984

[54] CONCENTRICITY MEASURING INSTRUMENT

[75] Inventor: Brian E. Lock, Oakland, N.J.

[73] Assignee: RCA Corporation, New York, N.Y.

[21] Appl. No.: 354,205

[22] Filed: Mar. 3, 1982

[51] Int. Cl.³ .............................................. G01B 5/25
[52] U.S. Cl. .............................. 33/172 D; 33/169 C; 33/174 Q; 33/181 R; 33/412
[58] Field of Search ............ 33/172 D, 169 C, 174 Q, 33/180 R, 181 R, 412; 248/DIG. 4; 409/218

[56] References Cited

U.S. PATENT DOCUMENTS

| | | | |
|---|---|---|---|
| 2,860,419 | 11/1958 | Muller | 33/172 D |
| 2,932,090 | 4/1960 | Muller | 33/172 D |
| 3,129,918 | 4/1964 | Bradley | 33/172 D X |
| 3,442,478 | 5/1969 | Parapetti | 33/172 D X |
| 3,914,869 | 10/1975 | Merz et al. | 33/172 D |
| 4,208,157 | 6/1980 | Guatino et al. | 33/172 D |

Primary Examiner—William D. Martin, Jr.
Attorney, Agent, or Firm—Birgit E. Morris; Donald S. Cohen

[57] ABSTRACT

An instrument for determining the alignment of two objects includes a support in the form of a cylindrical body having a longitudinal axis. The support has means on one end for releasably mounting the support in an opening in one of the objects being aligned. The support fits into a recess in a housing which can rotate about the longitudinal axis of the support. A gauge carrier is pivotally mounted on the housing. A gauge is mounted on the gauge carrier and has a finger pivotally mounted thereon and projecting therefrom. The gauge is adapted to detect pivotal movement of the finger. The finger is adapted to contact the other object and as the housing is rotated about the support will pivot toward or away from the longitudinal axis if the other object is not in alignment with the one object. The pivotal movement of the finger is detected by the gauge.

7 Claims, 3 Drawing Figures

CONCENTRICITY MEASURING INSTRUMENT

BACKGROUND OF THE INVENTION

The present invention relates to an instrument for measuring the concentricity relation between two objects, and more particularly to an instrument for measuring the alignment of opposed mold plates in a mold press.

For many purposes, such as in molding an article, it is necessary to provide accurate alignment between two objects, such as two parts of a mold. This is particularly desirable in a mold for molding recorded information discs. The information on the disc is generally along a spiral track on each surface of the disc and it is highly desirable that the tracks on both sides of the disc be concentric with respect to the center of the disc. Thus, when the mold plates of the mold are mounted in a press it is highly desirable to be able to accurately align the plates with respect to each other. Therefore, it would be desirable to have an instrument which can be used to quickly and accurately align the two mold plates. In addition, the instrument would have to be relatively small in size because of the limited space provided between the mold plates in the press.

SUMMARY OF THE INVENTION

An apparatus for measuring the alignment between two objects includes a support having a longitudinal axis. The support has means for mounting it on one of the objects with the longitudinal axis of the support being along an alignment axis of the one object. An elongated finger has means for mounting the finger on the support for rotation about the longitudinal axis of the support and for pivoting the finger toward and away from the longitudinal axis of the support. The finger is adapted to engage the other object to determine the alignment of the object with respect to the alignment axis of the one object.

DETAILED DESCRIPTION OF THE PREFERRED EMBODIMENT

Figure 1:
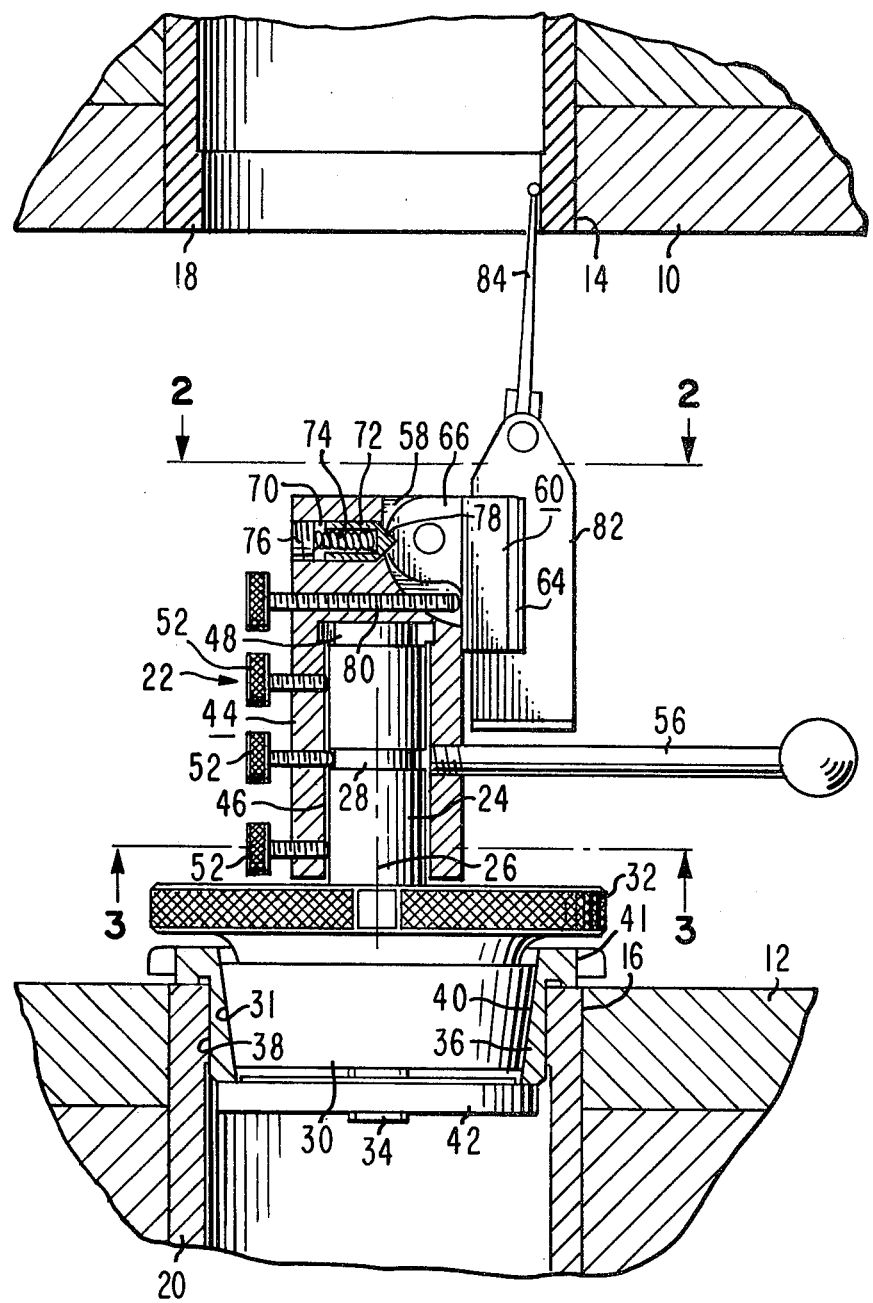
FIG. 1 is a sectional view of a portion of a mold press having mounted therein the measuring instrument of the present invention.

Referring to FIG. 1, there is shown a pair of mold plates 10 and 12 mounted on the opposed platens (not shown) of a mold press. The mold plates 10 and 12 have central openings 14 and 16 respectively therethrough and bearing sleeves 18 and 20 are secured in the openings 14 and 16 respectively. It is desirable that the mold plates 10 and 12 be positioned so that the longitudinal axes of the bearing sleeves 18 and 20 are in accurate alignment. The mold plates 10 and 12 are mounted on the platens of the mold press so that they can be moved to achieve this alignment. The measuring instrument of the present invention, generally designated as 22, is mounted on the mold plate 12 and is adapted to accurately determine the alignment of the two mold plates 10 and 12.

Measuring instrument 22 includes a support 24 in the form of a cylindrical body having a longitudinal axis, indicated by the line 26, around which all measurements are made. The support 24 has an annular groove 28 in its cylindrical surface substantially intermediate its ends. The support 24 is provided with means for mounting the instrument 22 on the mold plate 12. The mounting means includes a frustro-conical mandrel 30 having the support 24 secured to and extending from the center of its larger diameter end. A flange 32 extends radially outwardly from the larger diameter end of the mandrel 30. The outer surface of the flange 32 is knurled to permit gripping the flange. A threaded shank 34 projects from the center of the smaller diameter end of the mandrel 30. A sleeve 36 surrounds the mandrel 30. The sleeve 36 has a cylindrical outer surface 38 and a conical inner surface 40. The conical inner surface 40 of the sleeve 36 mates with the conical surface 31 of the mandrel 30. The sleeve 36 has a slit (not shown) extending longitudinally therethrough so that the sleeve is expandable. A flange 41 extends radially outwardly from the top end of the sleeve 36. A nut 42 extends across the bottom end of the sleeve 36 and is threaded on the threaded shank 34 of the mandrel 30. The nut 42 is secured to the sleeve 36, such as by a pin (not shown), so that the nut 42 will not rotate with respect to the sleeve 36 but will allow expansion of the sleeve.

Figure 2:
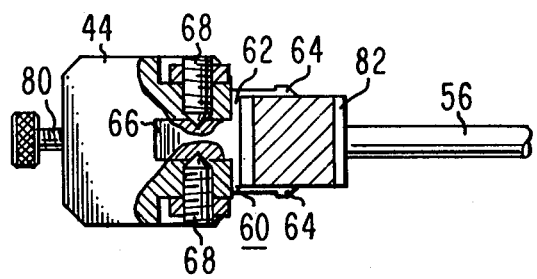
FIG. 2 is a sectional view taken along the line 2—2 of FIG. 1.
Figure 3:
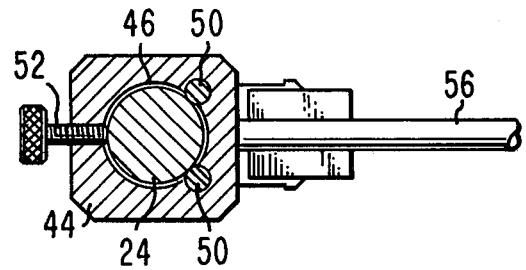
FIG. 3 is a sectional view taken along line 3—3 of FIG. 1.

A housing 44 is mounted on the support 24. The housing 44 is an elongated body which, as shown in FIGS. 2 and 3, is of substantially square transverse cross-section. The housing 44 has a blind, cylindrical recess 46 extending longitudinally therealong from its bottom end. The recess 46 is of a diameter slightly greater than the diameter of the support 24 and of a length slightly greater than the length of the support 24 so as to receive the support 24 therein. A thrust washer 48 is provided between the bottom of the recess 46 and the top of the support 24 so that the housing 44 is rotatably supported on the support 24. As shown in FIG. 3, a pair of bearing pins 50 extend longitudinally through the housing 44 adjacent the surface of the recess 46. The bearing pins 50 extend substantially the full length of the recess 46, are of a diameter to project slightly radially beyond the surface of the recess, and are circumferentially spaced apart about 90 degrees. Three headed set screws 52 are threaded through the housing 44 to the recess 46. The set screws 52 are in longitudinal alignment with one of the set screws being adjacent the open end of the recess 46 and another being adjacent the closed end of the recess 46. The set screws 52 are circumferentially spaced about 135 degrees from each of the bearing pins 50. Each of the set screws 52 has a tip of a plastic material, such as nylon. The set screws 52 engage the surface of the support 24 to pull the bearing pins 50 against the surface of the support 24 so as to properly align the housing 44 with the longitudinal axis 26 of the support 24. As shown in FIG. 1, the third set screw 52 is positioned to fit into the annular groove 28 in the support 24. This prevents longitudinal movement of the housing 44 with respect to the support 24 while still allowing rotation of the housing around the support. A handle 56 is secured to and projects outwardly from the housing 44 whereby the housing 44 can be rotated about the support 24.

The housing 44 has a notch 58 in one side thereof which notch extends from the top surface of the housing to a point spaced from the closed end of the receses 46. A gauge carrier 60 is pivotally supported in the notch 58. As shown in FIG. 2, the gauge carrier 60 includes a flat base 62 having a pair of spaced parallel arms 64 extending from one side thereof and a finger 66 extending from the center of the other side thereof. As shown in FIG. 1, the finger 66 is at one end of the base 62. The finger 66 fits in the notch 58 in the housing 44 and, as shown in FIG. 2, is pivotally secured in the notch 58 by a pair of pivot pins 68 which project from opposite sides of the notch 58 and engage the finger 66. The housing 44 has a hole 70 therethrough from the side opposite the side containing the notch 58 to the notch 58. A ratchet member 72 is within the hole 70 and has a pointed end extending into the notch 58. A spring 74 is compressed between the ratchet member 72 and a retainer member 76 secured in the end of the hole 70. The spring 74 presses the ratchet member 72 against the surface of the finger 66. The finger 66 has a notch 78 therein which receives the end of the ratchet member 72 when the gauge carrier 60 is pivoted to a position with the base 62 being parallel to the longitudinal axis 26. A headed adjustment screw 80 is threaded through the housing 44 inbetween and substantially parallel to the hole 70 and the closed end of the recess 46. The adjustment screw 80 extends into the notch 58 and engages the base 62 of the gauge carrier 60 when the gauge carrier 60 is in its position substantially parallel to the longitudinal axis 26.

A linear movement gauge 82 is mounted on the gauge carrier 60. The gauge 82 is mounted between and secured to the arms 64 of the carrier 60. The gauge 82 has a finger 84 projecting from one end thereof and pivotally mounted thereon. The gauge 82 is of a type which will detect pivotal movement of the finger 84 and which will give off an electrical signal indicating such movement. One such gauge is a bi-directional gauge head number 599-988 made by Brown and Sharp Manufacturing Company of Rhode Island. The gauge 82 is mounted on the gauge carrier 60 such that when the gauge carrier is in its position substantially parallel to the longitudinal axis 26 the finger 84 extends away from the top of the housing 44 substantially parallel to the longitudinal axis 26 but pivotal toward and away from the axis 26.

In the operation of the measuring instrument 22, such as to align the mold plates 10 and 12 so that the longitudinal axes of the bearing sleeves 18 and 20 are in alignment, the measuring instrument 22 is mounted in the bearing sleeve 20 of the lower mold plate 12. This is achieved by inserting the sleeve 36 having the mandrel 30 therein in the bearing sleeve 20 until the flange 41 is seated on the end surface of the bearing sleeve 20. The mandrel 30 is then rotated by means of the knurled flange 32 to thread the shank 34 into the nut 42. This pulls the conical surface 31 of the mandrel 30 downwardly against the conical inner surface 40 of the sleeve 36 causing the sleeve 36 to expand radially outwardly against the inner surface of the bearing sleeve 20. This tightly secures the instrument 22 in the bearing sleeve 20 with the longitudinal axis 26 of the support 24 being aligned with the longitudinal axis of the bearing sleeve 20. Prior to mounting the instrument 22 on the lower mold plate 12, the gauge carrier 60 is pivoted to a position where the gauge 82 and finger 84 extend substantially normal to the longitudinal axis 26. This shortens the overall longitudinal length of the instrument 22 so as to permit ease of inserting the instrument between the two mold plates 10 and 12. Once the instrument 22 is secured in the bearing sleeve 20, the gauge carrier 60 is pivoted to the position shown in FIG. 1 wherein the gauge 82 and finger 84 extend substantially parallel to the longitudinal axis 26. The gauge carrier 60 is held in this position by the ratchet member 72 fitting in the notch 78 in the finger 66. The adjustment screw 80 can be rotated to adjust the position of the finger 66 so as to achieve a zero or other desired initial output signal from the gauge 82.

With the gauge 82 and finger 84 being in the position substantially parallel to the longitudinal axis 26, the end of the finger 84 will contact the inner surface of the bearing sleeve 18 in the upper mold plate 10. The housing 44 is then rotated by means of the handle 56 so that the gauge finger 84 is rotated about the longitudinal axis 26. If the upper mold plate 10 is not in exact alignment with the bottom mold plate 12, as the gauge finger 84 is rotated about the longitudinal axis 26, the gauge finger 84 will be pivoted either toward or away from the longitudinal axis 26 depending on the direction of offset of the mold plate 10. The gauge 82 will detect the pivotation of the finger 84 and will provide a corresponding electrical signal. The signal can be read by a suitable meter which can also indicate the direction of the offset. The upper mold plate 10 can then be moved in the appropriate direction to properly align the bearing sleeve 18 with the longitudinal axis 26. When the housing 44 can be rotated around the longitudinal axis 26 without obtaining any pivotation of the finger 84, there is achieved the desired alignment of the mold plates 10 and 12. Thus, there is provided by the present invention a measuring instrument which can be easily and quickly mounted between two objects and which will provide accurate alignment of the two objects.

I claim:

1. Apparatus for measuring the alignment between two objects comprising:
    a support including a cylindrical body having a longitudinal axis;
    means for mounting said support on one of the objects with the longitudinal axis of said cylindrical body being along an alignment axis of the one object;
    an elongated finger;
    a housing having a cylindrical recess extending from one end, said cylindrical body fitting in said recess and supporting said housing for rotation about said longitudinal axis and said finger being mounted on said housing for pivotation toward and away from said longitudinal axis;
    said finger being adapted to engage the other of said objects to determine the alignment of the other object with respect to the alignment axis of the one object.

2. Apparatus in accordance with claim 1 in which the means for mounting the support on the one object includes a mandrel at one end of the support, said mandrel having a conical outer surface which is of its largest diameter adjacent the support, a sleeve surrounding the mandrel and being radially flexible, said sleeve having a cylindrical outer surface and a conical inner surface which mates with the conical surface of the mandrel, and means for providing relative longitudinal movement between the mandrel and sleeve to radially expand and contract the sleeve.

3. Apparatus in accordance with claim 2 in which the means for providing relative longitudinal movement between the mandrel and the sleeve includes a nut extending across the smaller diameter end of the inner surface of the sleeve and secured to the sleeve and a threaded stud extending from the smaller diameter end of the mandrel and threaded through the nut.

4. Apparatus in accordance with claim 1 in which the finger is pivotally mounted on a gauge which detects pivoted movement of the finger, a gauge carrier is mounted on the enclosed end of the housing and the gauge is mounted on the gauge carrier.

5. Apparatus in accordance with claim 4 in which the gauge carrier is pivotally mounted on the housing for pivotation between a first position in which the gauge and finger extend transversely across the longitudinal axis of the support and a second position in which the gauge and finger extend substantially parallel to said longitudinal axis with the finger extending away from the closed end of the housing.

6. Apparatus in accordance with claim 5 including means for retaining the gauge in the said second position.

7. Apparatus in accordance with claim 5 in which the housing has a slot in one side thereof extending from its closed end and the gauge carrier has a finger fitting and pivotally supported in said slot.

* * * * *